US009869548B2

(12) United States Patent
Heining

(10) Patent No.: US 9,869,548 B2
(45) Date of Patent: Jan. 16, 2018

(54) METHOD FOR DETERMINING THE INCLINATION OF A TOWER

(75) Inventor: Nils Heining, Pinneberg (DE)

(73) Assignee: GL Garrad Hassan Deutschland GmbH, Kaiser-Wilhelm-Koog (DE)

(*) Notice: Subject to any disclaimer, the term of this patent is extended or adjusted under 35 U.S.C. 154(b) by 987 days.

(21) Appl. No.: 14/343,050

(22) PCT Filed: Sep. 5, 2012

(86) PCT No.: PCT/EP2012/067348
§ 371 (c)(1),
(2), (4) Date: Jun. 5, 2014

(87) PCT Pub. No.: WO2013/034607
PCT Pub. Date: Mar. 14, 2013

(65) Prior Publication Data
US 2014/0316740 A1    Oct. 23, 2014

(30) Foreign Application Priority Data
Sep. 6, 2011   (DE) .......................... 10 2011 053 317

(51) Int. Cl.
*G01C 9/02*     (2006.01)
*F03D 11/00*    (2006.01)
*F03D 17/00*    (2016.01)

(52) U.S. Cl.
CPC ............... *G01C 9/02* (2013.01); *F03D 17/00* (2016.05); *F05B 2250/314* (2013.01);
(Continued)

(58) Field of Classification Search
CPC .............. G01C 9/00; G01C 9/02; F03D 17/00
(Continued)

(56) References Cited

U.S. PATENT DOCUMENTS

| 6,640,609 B1 | 11/2003 | Nadkarni | |
| 8,366,389 B2* | 2/2013 | Hoffmann | F03D 7/0224 416/1 |
| 2011/0140420 A1* | 6/2011 | Loh | F03D 7/0224 290/44 |

FOREIGN PATENT DOCUMENTS

| EP | 2133563 A1 * | 12/2009 | ............. F03D 7/042 |
| WO | WO 2007089136 A2 * | 8/2007 | ........... F03D 7/0224 |

(Continued)

OTHER PUBLICATIONS

International Search Report dated Jan. 25, 2013, from parent International Patent Application No. PCT/EP2012/067348.

*Primary Examiner* — John Breene
*Assistant Examiner* — Yaritza H Perez Bermudez
(74) *Attorney, Agent, or Firm* — North Weber & Baugh LLP

(57) ABSTRACT

A method for determining the inclination of a tower, in particular of a wind turbine, in relation to the gravitational field, by evaluating the output signal from an acceleration sensor configured to pick up static acceleration in the direction of a sensor measurement axis, which method is simple to use and can be carried out on any wind turbines. It is proposed that the acceleration sensor is attached to a component, preferably to a main frame, which can be rotated about the longitudinal axis of the tower in an azimuth angular range of at least 180°, such that the sensor measurement axis is oriented substantially parallel to the plane of rotation of the component, the output signals, in the case of various azimuth angles, being successively measured and recorded by rotating the component between measurements, the inclination being determined by evaluation of the series of measurements obtained.

13 Claims, 5 Drawing Sheets

(52) U.S. Cl.
CPC ..... *F05B 2250/35* (2013.01); *F05B 2260/845* (2013.01); *F05B 2270/329* (2013.01); *F05B 2270/807* (2013.01)

(58) Field of Classification Search
USPC ........................................................ 702/154
See application file for complete search history.

(56) References Cited

FOREIGN PATENT DOCUMENTS

WO  2009001310 A1  12/2008
WO  WO 2009001310 A1 * 12/2008 .............. G01P 15/00

* cited by examiner

METHOD FOR DETERMINING THE INCLINATION OF A TOWER

CROSS REFERENCE TO RELATED APPLICATIONS

This application is a US National Phase 371 of International Patent Application No. PCT/EP12/067348, filed Sep. 5, 2012, which claims foreign priority to German Patent Application No. 102011053317.6, filed Sep. 6, 2011, which applications are hereby incorporated herein by reference in their entireties.

BACKGROUND

The present invention relates to a method for determining the inclination of a tower, in particular of a wind turbine, in relation to the gravitational field, by evaluating the output signal from an acceleration sensor configured to pick up static acceleration in the direction of a sensor measurement axis.

The problem of shifting foundations arises specifically in offshore wind turbine constructions. The distinctive vibrating ability of the elongate wind turbines further intensifies the problem of the shifting of the wind turbines. To determine undesirable shifts of this type which, in the case of wind turbines, could have all kinds of undesirable effects, such as uneven stresses on bearings, there is therefore a need for generic methods which determine the inclination.

The measurement is difficult, since the wind turbine can often be vibrating while the measurement is being carried out, which is associated with accelerations which influence the measuring signal of an acceleration sensor with an amplitude which significantly exceeds that of the measuring signal produced by the mounting.

EP 2 133 563 A1 discloses a method of this type in which the acceleration, speed, position and inclination of the nacelle are determined as a result of a signal evaluation which comprises a plurality of steps and is based on measured values from an acceleration sensor in the nacelle of the wind turbine.

Another method, used in practice, for determining the inclination of wind turbines is based on the bubbles of a spirit level being read out via a video camera. This method is unsatisfactory in terms of measurement in every respect. A further problem is that the inclination to be measured can be so small that tilts in relation to the tower vertical axis of the acceleration sensor used for the measurement could falsify the measurement result beyond recognition.

It is therefore the object of the present invention to provide a method for determining the inclination of a tower of the type mentioned at the outset, which is simple to use and can be implemented on any wind turbines, for example by measurement personnel using a mobile measuring device, for example within the framework of routine tests.

This object is achieved according to the invention by a method for determining the inclination of a tower of the type mentioned at the outset, in which method the acceleration sensor is attached to a component, preferably to a main frame, which can be rotated about the longitudinal axis of the tower within an azimuth angular range of at least 180°, preferably of 360°, such that the sensor measurement axis is oriented substantially parallel to the plane of rotation of the component, the output signals being measured and recorded successively in the case of different azimuth angles, in which the component is rotated between measurements, the inclination being determined by evaluation of the series of measurements obtained thus. According to the invention, an acceleration sensor for example can be used, which is already present for other reasons, usually for measuring the vibration of the wind turbine. Compared to known methods for measuring inclination using acceleration sensors, recording the output signal in the case of different azimuth angles of the nacelle has the advantage that a large number of data points functionally connected to the required measured value can be obtained, which allow a good statistical averaging of the measured values. This is very advantageous on account of the initially mentioned vibrations under which the measurement object will usually stand. Acceleration sensors which are suitable within the context of the invention include all known acceleration sensors which can also measure constant accelerations in order to be able to detect the gravitational acceleration and the direction thereof. For example, devices with a movable test mass can be used in the simplest case. However, systems based on flexible quartz rods or magnetically stabilised masses are also possible. Finally, microelectromechanical systems (MIMS) are measured for the inclination. In any case, it is important that the devices only output the acceleration along one measurement axis. In particular, the acceleration sensor in the context of the invention can be fitted around the tower axis of a rotatable machine house. The series of measurements is ideally carried out for different azimuth values in the region of 360° corresponding to a full rotation of the component. This has the particular advantage that on reaching a position of 180° relative to the azimuth angle, the measuring signal can be doubled. If a full 360° rotation can be carried out, for reasons of symmetry a redundant series of measurements is obtained for the measurement at an angular range of 0° to 180°, which leads to a further statistical improvement in the measured values.

The component can be rotated in uniform azimuth angle steps, to simplify the evaluation of the series of measurements for the purpose of determining the inclination. For example, it is possible for measurements to be made in 10° steps relative to the azimuth angle, in order to obtain a series of measurements comprising 36 values.

The statistical elimination of measurement errors caused by vibrations of the tower is furthered when at any given azimuth angle a series of output signals is successively measured and recorded and then an averaged value is determined and recorded from the series of output signals and is used as a basis for the series of measurements. For example, in every given azimuth angle position in which a measurement is to be made, measuring can be carried out over three minutes at a high sampling rate. During averaging, time-dependent portions of the acceleration measured values for the most part then stand out.

In a development of the invention, in the method the evaluation can include the determination of a maximum value and of a minimum value from the series of measurements as well as the determination of the difference between the maximum and the minimum. In this respect, a maximum value of the acceleration signal will be expected when an acceleration sensor is aligned by the measurement axis thereof such that a maximum direction component is aligned vertically. The associated minimum value will conform with the corresponding measured value of the series for an azimuth angle shifted by 180°.

In particular, the inclination can be calculated according to the invention using the following formula:

$$\alpha = \arcsin\left[\frac{1}{2}\frac{a_{max} - a_{min}}{g}\right]$$

α denoting the inclination angle, g denoting the gravitational acceleration, $a_{max}$ denoting the maximum value of the series of measurements and $a_{min}$ denoting the minimum value of the series of measurements. Geometric considerations, which are explained in detail further below in connection with the figures, show that the required inclination angle of the tower relative to the plumb line direction can be determined using this formula when values are evaluated at maximum and a minimum acceleration for a series of measurements which [ . . . ] for measuring points which belong to a full rotation of the rotatable component about an azimuth angle range of 0° to 360°. In this respect, the maximum value corresponds to an azimuth position of the rotatable component, in which the vertical component of the sensor measurement axis is aligned downwards parallel to the vertical. In contrast thereto, the minimum value corresponds to an azimuth angle value of the component, for which the vertical component of the sensor measurement axis is aligned vertically upwards, i.e. is directed counter to the force of gravity.

The method is substantially improved when the inclination is calculated using the following formula:

$$\alpha = \arcsin\left[\frac{1}{2}\frac{a_{max} - a_{min}}{g \cdot \cos(\beta)}\right]$$

β denoting the tilting of the sensor measurement axis relative to the plane of rotation. Consideration of a possible tilting of the sensor measurement axis relative to the plane of rotation of the component is considered by means of this functional correlation, like geometric considerations which are explained in connection with the description of the figures. Thus, according to the invention, if the tilting angle β is known, the influence thereof can be exactly calculated in the evaluation of the series of measurements in order to calculate the inclination angle α.

In a preferred configuration of the method according to the invention, the tilting of the sensor measurement axis relative to the plane of rotation is determined from the series of measurements, preferably by determining the offset of a variable portion of the series of measurements, and will be considered in the determination of the inclination. Geometric considerations, which are explained in detail further below in connection with the figures, show that the result of tilting the sensor measurement axis relative to the plane of rotation of the component is that a part, varying with the azimuth angle in the case of the non-vanishing tilting β of the sensor measurement axis relative to the plane of rotation, is shifted in the form of an offset relative to the zero point. The determination of the offset from the series of measurements is quite possible with conventional signal processing using customary methods, well-known per se, for curve sketching.

In particular, according to the invention, the offset can be determined by forming the sum of the maximum value and of the minimum value and dividing the product by two. In the event of sinusoidal variation of the measuring signal, to be expected for geometric reasons during rotation, as a function of the azimuth angle, the portion, variable with the azimuth angle, with the vanishing tilting angle β is symmetrical about the horizontal axis, so that the sum of maximum value and minimum angle is zero.

In a preferred configuration of the method according to the invention, calculates for the tilting from the offset using the following formula:

$$\beta = \arcsin\left[\frac{a_0}{g}\right]$$

β denoting the tilting, g denoting the gravitational acceleration and $a_0$ denoting the offset of the variable portion of the series of measurements. The offset can for geometric considerations regarding the measurement method according to the invention, which are described in further detail further below with reference to the figures, the offset value of the measured acceleration can be identified by the value which is obtained when the azimuth angle is adjusted such that the sensor measurement axis is aligned so that there would not be any inclination in the vertical direction of the sensor measurement axis for a vanishing tilting.

To increase the confidence interval of the measuring method according to the invention, a second acceleration sensor can be attached to the component such that the sensor measurement axis is oriented substantially parallel to the plane of rotation of the component and at a right angle to the sensor measurement axis of the first acceleration sensor, the output signal of the second acceleration sensor being measured and recorded in addition to the output signal of the first acceleration sensor, the inclination additionally being determined by a configuration of the second series of measurements obtained thus. Geometric considerations regarding the measurement method show that the series of measurements, which corresponds to the second acceleration sensor of the first series of measurements, shifted by 90° in respect of the azimuth angle. The evaluation of the series of measurements of the second acceleration sensor, which according to the invention is crossed relative to the first acceleration sensor, thereby provides a redundancy which can advantageously be used for the statistical averaging of the inclination values which have been obtained. Furthermore, many wind turbines are already provided with crossed acceleration sensors or integrated biaxial acceleration sensors. Therefore, the method according to the invention can advantageously be implemented in wind turbines of this type in that, during the rotation of the machine house, the output signals from these two acceleration sensors are to be evaluated. With regard to the considerations regarding the tilting of the second acceleration sensor relative to the plane of rotation, the analogous considerations and methods according to the invention for the determination thereof from the series of measurements apply, like the above-stated considerations on the first acceleration sensor.

A further improvement of the method according to the invention is obtained when a further acceleration sensor is attached to the component such that the sensor measurement axis is oriented substantially vertically to the plane of rotation of the component, the output signal of the further acceleration sensor being measured and recorded in addition to the output signal of the first acceleration sensor, the inclination additionally being determined [by] an evaluation of the further series of measurements obtained thus. According to the invention, this further acceleration sensor is aligned vertically to the first acceleration sensor and also vertically to a second acceleration sensor which may be used. The output signal from this further acceleration sensor may be theoretically invariant compared to a variation of the azimuth angle, out of mixed considerations, and therefore may be used as a reference for the series of measurements of the other acceleration sensors. In particular, the vertical acceleration sensor can be used to increase accuracy if there is a high level of cross-sensitivity of the sensors, in order to reduce the influence of the cross-sensitivity. 'Cross-sensitivity' is understood as meaning that an acceleration sensor is also sensitive to accelerations which occur at a right angle to the sensor measurement axis.

Finally, in an advantageous configuration of the method according to the invention, the azimuth angle can be determined for the output signal and the series of measurements, the second series of measurements and/or the further series of measurements can be supplemented by recording the azimuth angle associated with each output signal, to produce a function graph consisting of ordered pairs, to calculate a direction of the inclination. Whereas it is thus not necessary for the basic principle of the method according to the invention to record absolute values of the azimuth angle, since only maximum and minimum values as well as offsets are used for the evaluation, a determination of the azimuth angle can be used absolutely for characterising the alignment of the sensor measurement axis. Inter alia, this allows an inclination direction to be established.

Finally, the object of this invention is achieved by a device for implementing the method of the invention according to any one of claims 1 to 12. The device comprises an evaluation unit as well as means for reading out output signals from the acceleration sensors which are either already components of the wind turbine to be measured or which, as components of the device according to the invention, are to be connected to the wind turbine to be measured. The evaluation unit is configured to carry out the evaluations described in the method claims.

The invention is described by way of example in a preferred embodiment with reference to drawings, and further advantageous details can be seen in the figures of the drawings.

Functionally identical parts have been provided with the same reference numerals.

DETAILED DESCRIPTION OF THE PREFERRED EMBODIMENTS

Figure 1:
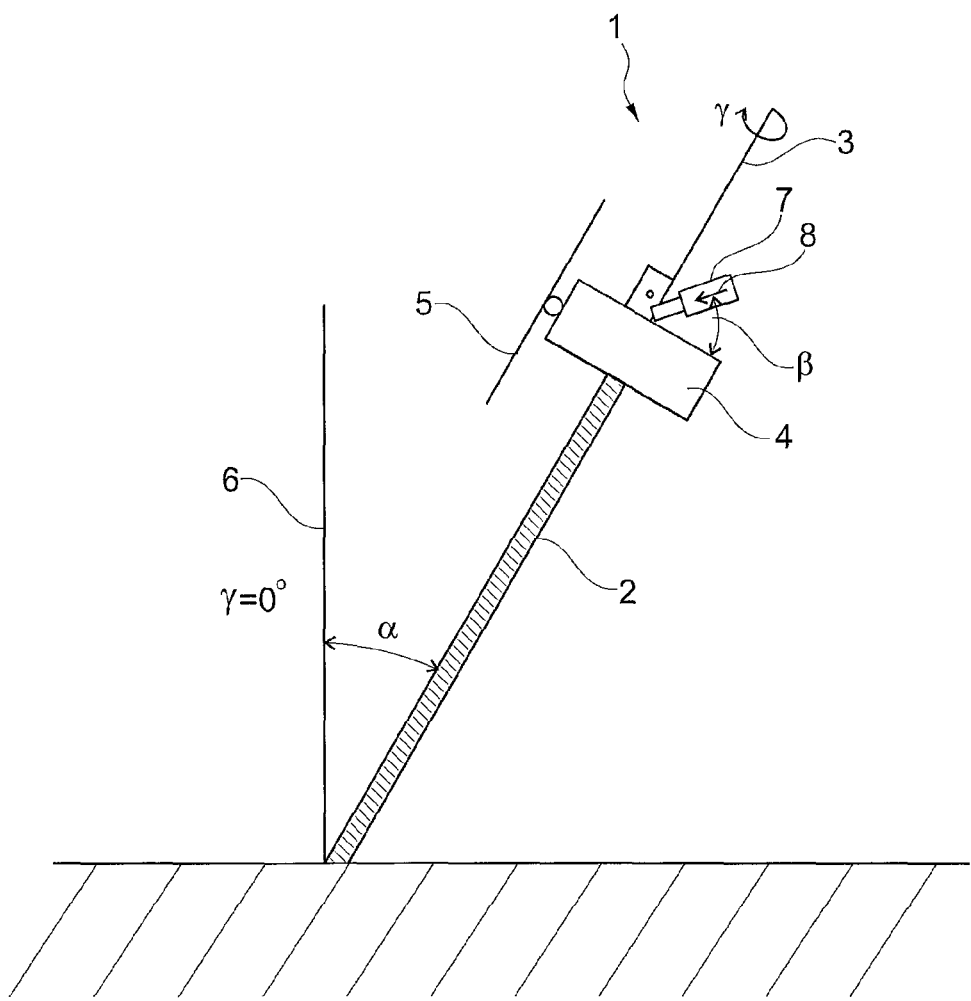
FIG. 1 is a schematic side view of an inclined wind turbine, in which the machine house is oriented in an azimuth angle position of 0°.

FIG. 1 is a side view of a wind turbine 1 with a tower 2 and a machine house 4 rotatable at the upper end of the tower 2 about the longitudinal axis 3 of the tower 2 [ . . . ] different azimuth angles γ. For orientation purposes, a rotor 5 is schematically indicated on the machine house 4. The tower 2 is oriented inclined at an angle α by its longitudinal axis 3 in relation to the vertical 6 and thereby in relation to the direction in which gravity acts. Fitted to the machine house 4 is an acceleration sensor 7, the measurement axis 8 of which is indicated by an arrow. The measurement axis 8 is arranged inclined by a tilt angle β relative to the plane of rotation of the machine house 4, said plane of rotation being indicated by the upper edge of the machine house 4.

Figure 2:
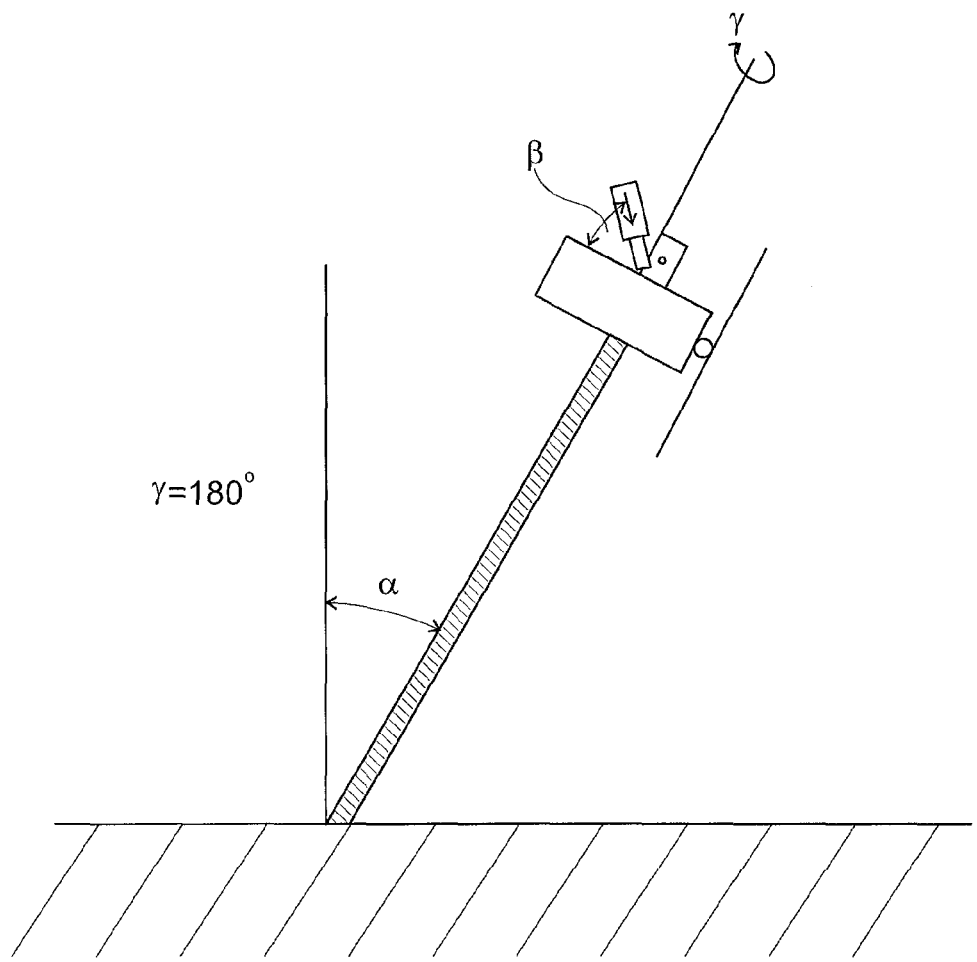
FIG. 2 is a view like that of FIG. 1, but the machine house has been rotated in an azimuth angle position of 180°.

FIG. 2 shows the wind turbine [ . . . ] the same illustration conventions as FIG. 1. However, unlike the situation shown in FIG. 1, the machine house 4 has been rotated by 180° about the longitudinal axis 3 of the tower 2 compared to the position shown in FIG. 1. This can be recognised by the fact that in the side view, the rotor 5 is shown on the right-hand side on the machine house 4. It can be seen that the acceleration sensor 7 and the measurement axis 8 thereof assume a different angle with respect to the vertical 6, compared to the position shown in FIG. 1. In this embodiment, it is assumed, as is usual in the case of wind turbines, that the machine house 4 is rotatable about the longitudinal axis 3 of the tower 2 so that the plane of rotation stands vertically on the longitudinal axis 3 of the tower 2. However, with appropriate adjustments made to the signal evaluation, the method according to the invention can also be used for cases in which the axis of rotation of the machine house 4 does not coincide with the longitudinal axis 3 of the tower 2. Finally, in FIG. 3 the wind turbine 1 according to FIGS. 1 and 2 is shown with the same illustration conventions as in FIGS. 1 and 2. In this respect, unlike FIGS. 1 and 2, the machine house 4 is rotated by 90° about the longitudinal axis 3 of the tower 2 compared to FIG. 1. This can be recognised by the fact that the rotor 5 is schematically shown below the plane of the drawing. In this position, the measurement axis 8 of the acceleration sensor 7 is oriented at a right angle into the plane of the drawing, as indicated by a cross. In the azimuth angle position of β=90° shown in FIG. 3, the acceleration sensor measurement axis 8 does not have a component parallel to the plane of the drawing.

Figure 3:
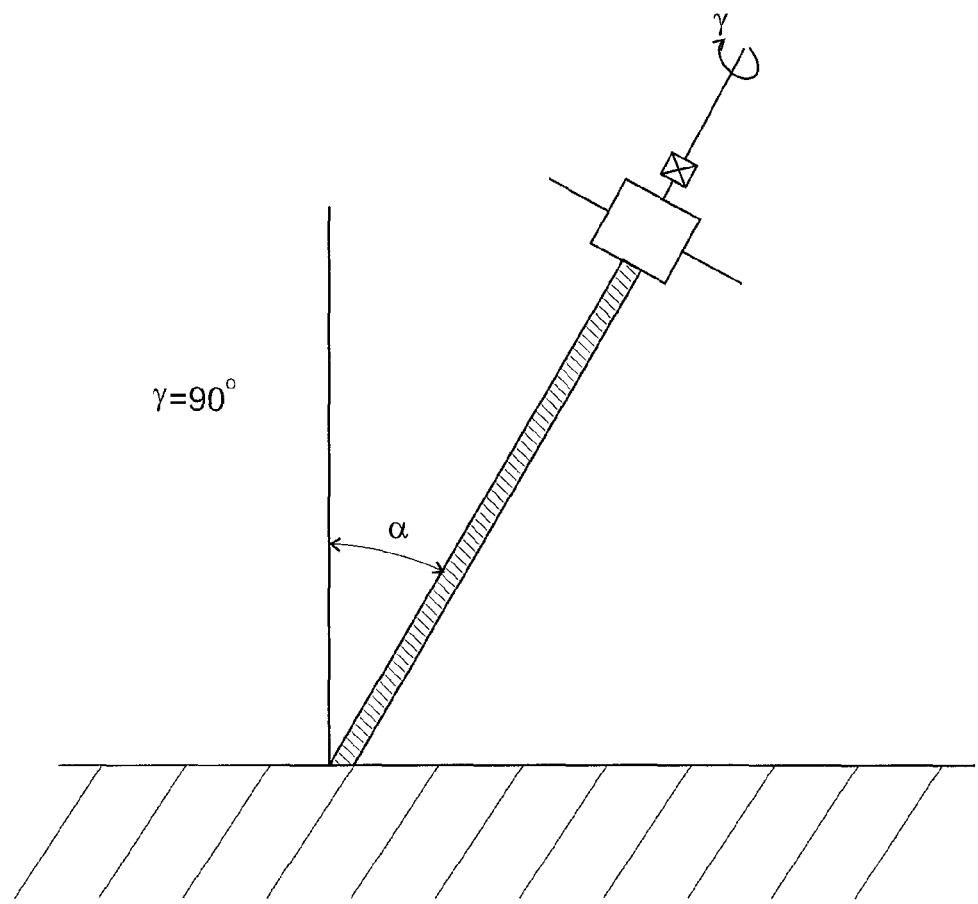
FIG. 3 is a view like that of FIGS. 1 and 2, but with an azimuth angle position of 90° of the machine house.
Figure 4:
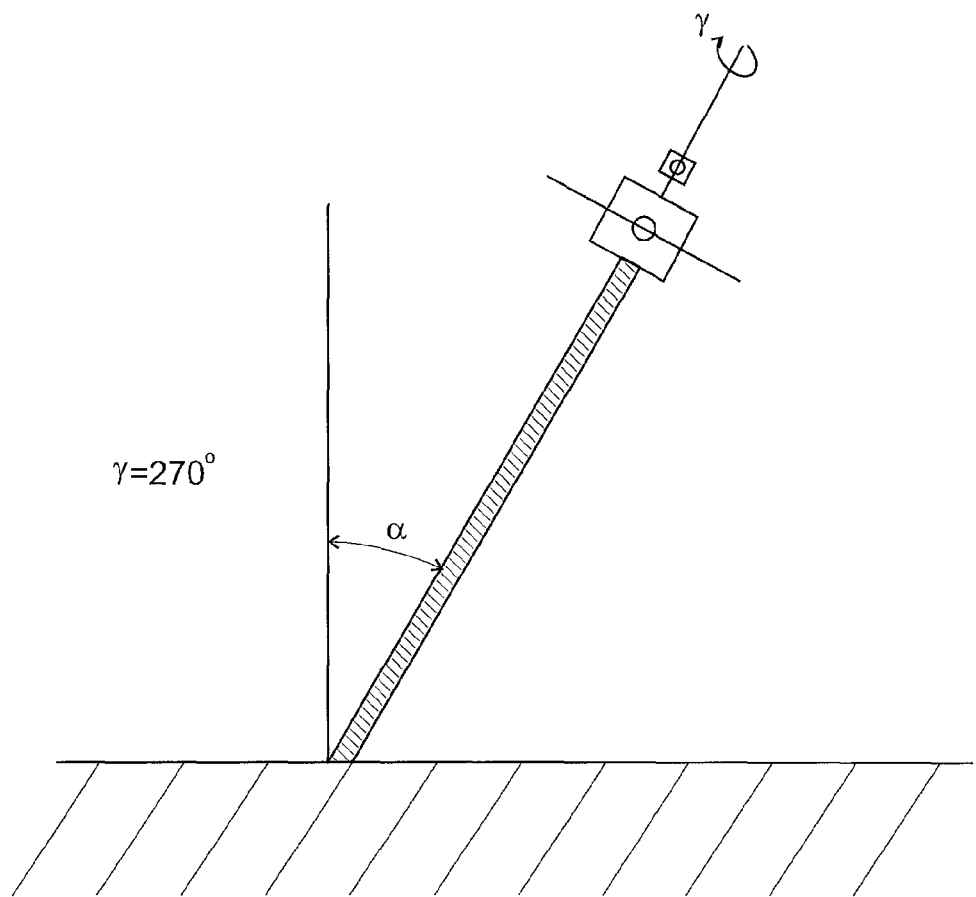
FIG. 4 is a view like that of FIGS. 1, 2 and 3, but with an azimuth angle of 270°.

Finally, in FIG. 4, the wind turbine 1 according to FIGS. 1, 2 and 3 is shown in an azimuth angle position of 280°. This azimuth angle position is schematically illustrated by the fact that the rotor 5 now stands above the machine house 4 with respect to the plane of the drawing. Accordingly, in this position the measurement axis 8 of the acceleration sensor 7 is directed out of the plane of the drawing, as indicated by a dot.

To implement the method according to the invention, the machine house 4, and thereby the acceleration sensor 7 attached thereto, is rotated in uniform increments from the azimuth angle position γ=0° according to FIG. 1 via the azimuth angle positions of 90° according to FIG. 3, of 180° according to FIG. 2 and 270° according to FIG. 4 back into the starting position according to FIG. 1. The output signal from the acceleration sensor 7 is recorded in every position of the azimuth angle γ. In order to eliminate as effectively as possible time-variable components of the output signal, the measurement is made for a time interval of for example 3 minutes at a relatively high sampling rate. An average value is then determined from the time series and is picked up as a measured value, associated with the respective azimuth angle, of a series of measurements.

Figure 5:
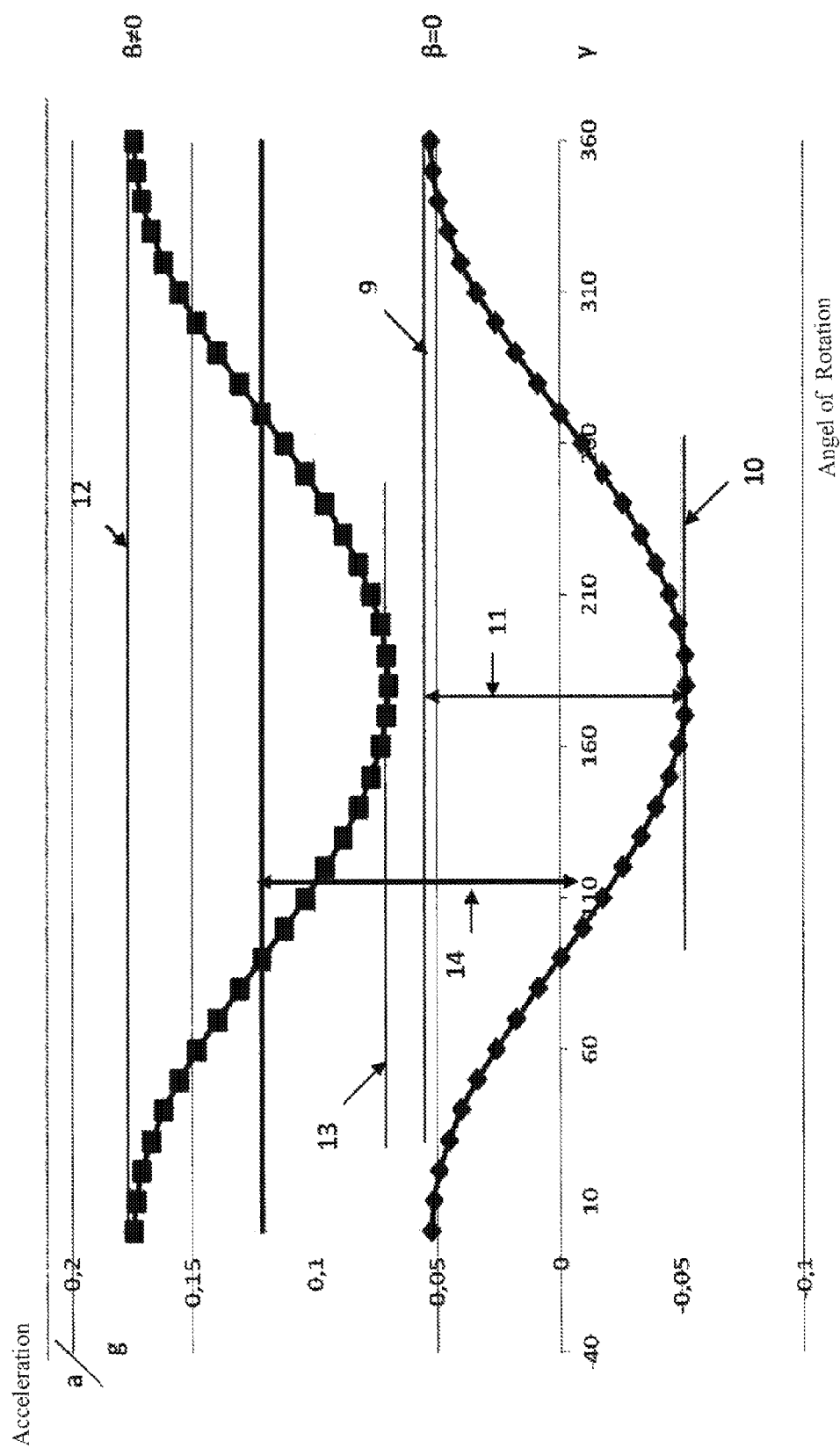
FIG. 5 is an exemplary illustration of the graph of a series of measurements for an acceleration sensor without tilting relative to the vertical axis of the azimuth bearing.

FIG. 5 is an idealised illustration of a graph of two series of measurements obtained by the described method according to the invention. In this respect, the vertical axis indicates the calculated, time-averaged acceleration values a in units of the gravitational acceleration g. By contrast the horizontal axis indicates the angle values of the azimuth angle γ, i.e. the angle of rotation of the machine house 4 about the longitudinal axis 3 of the tower 2 of the wind turbine 1. In this respect, in principle it is not absolutely necessary, in the method for angle values, for γ to be plotted on the horizontal axis. Instead, it is sufficient if it is ensured that the series of measurements are plotted in uniform increments of the azimuth angle γ.

The lower series of measurements of FIG. 5 identified by diamonds shows a curve of idealised series of measurements which would be obtained if the angle β of the tilt of the acceleration sensor measurement axis 8 relative to the plane of rotation of the machine house 4 is zero, so that there is no tilt. In this case it is seen that a course of the function graph is produced, which is symmetrical about the zero line. To evaluate the series of measurements, it is now possible according to the invention to determine a maximum value 9 and a minimum value 10. Thereafter, the difference 11 between the maximum value 9 and the minimum value 10 can be determined. The required inclination angle α can be determined from this difference using the formula:

$$\alpha = \arcsin\left[\frac{1}{2}\frac{a_{max} - a_{min}}{g}\right]$$

If the upper series of measurements in FIG. 5 [ ... ], which is characterised by squares and which [ ... ] an idealised series of measurements for an acceleration sensor, the axis of which is oriented in a non-vanishing angle β to the plane of rotation, the following is produced. During the evaluation, a maximum value 12 and a minimum value 13 is again calculated. In addition, however, an offset 14 of the series of measurements relative to the zero line is calculated. The offset indicates the shift of the portion, variable with γ, of the measuring signal relative to the zero line. To evaluate the upper series of measurements according to FIG. 5, the required inclination angle α is then determined using the formula:

$$\alpha = \arcsin\left[\frac{1}{2}\frac{a_{max} - a_{min}}{g \cdot \cos(\beta)}\right]$$

In this respect, the angle β, which is in the previously mentioned formula, is determined beforehand, using the offset value 14 and the following formula:

$$\beta = \arcsin\left[\frac{a_0}{g}\right]$$

The background to this is that geometric considerations, based on the principle geometric factors according to FIGS. 1 to 4, show that the measured acceleration values in the following functional connection with the inclination angle α and the tilt of the measurement sensor have indicating angle β $a_{sensor}=g \cdot \sin(\beta+\alpha \cos \gamma \cdot \alpha)$. It can be seen using the formula and on the basis of FIGS. 1 to 4 that the maximum values 9 and 12 where γ=0 and γ=360° are obtained, as shown in FIG. 1, for which the tilt β of the sensor 7 produces an excessive increase in the measured acceleration value. Equally, the minimum values 10 and 13 are associated with the azimuth position of 180° illustrated in FIG. 2. For purposes of understanding, it must always be ensured that the acceleration sensor 7 only ever measures the component of the acceleration, which is oriented in the direction of the acceleration sensor measurement axis 8. The determination and significance of the offset 14 can be illustrated with reference to FIGS. 3 and 4. In the azimuth positions of 90° and 270°, the inclination angle α does not contribute an acceleration component in the direction of the acceleration sensor measurement axis 8. Accordingly, in these positions of the azimuth angle, an acceleration sensor value different from zero is only caused by a tilt by the angle β.

In this respect, the evaluation of the series of measurements, as illustrated with reference to FIG. 5, is not based on a precise knowledge of the absolute value of the azimuth angle γ, since only maximum values 9, 12 and minimum values 10, 13 have to be evaluated, irrespective of their position on the horizontal axis. In the simplest case, the offset 14 [ ... ] be determined by subtracting the minimum value 13 from the maximum value 12 and then by subtracting half of this difference from the maximum value 12.

It is understood that the description provided here sets out from idealised conditions. In practice, a suitable signal smoothing by methods well-known to a person skilled in the art will initially be required.

Not shown in FIG. 5, but quite obvious with reference to this figure, the addition of a second acceleration sensor, which is also substantially in the plane of rotation of the machine house 4 but is rotated by 90° relative to the acceleration sensor 7, would produce corresponding curves which, however, would be shifted horizontally by 90°. A second acceleration sensor of this type could be evaluated analogously and a tilt angle, possibly different from the tilt of the first acceleration sensor, would have to be considered analogously. To examine effects caused by possible cross-sensitivities of the acceleration sensors, it is possible to use a further acceleration sensor which is mounted in the direction of the longitudinal axis 3 of the machine house 4 and thereby vertically to the plane of rotation.

Thus, the invention provides a method for measuring the inclination of a tower, in particular of a wind turbine, relative to the gravitational field, by evaluating the output signal from an acceleration sensor configured for picking up static acceleration in the direction of a sensor measurement axis, which method is easy to use, since no particular precision is required for attaching the acceleration sensors. The rotation of the machine house 4 about the longitudinal axis 3 of the tower 2 is provided in all conventional wind turbines 1, to allow optimum orientation to the wind. Thus, the measuring method according to the invention can advantageously be carried out without modifications being made to the wind turbine. Since, as already mentioned at the beginning, most wind turbines are already provided anyway with an acceleration sensor 7, possibly even with a plurality of acceleration sensors, it is possible in many cases to even dispense with the installation of an acceleration sensor, to implement the method. Instead, all that is necessary is for the signal from the on-board acceleration sensors to be picked up.

LIST OF REFERENCE NUMERALS 1 wind turbine
2 tower
3 longitudinal axis
4 machine house
5 rotor
6 vertical
7 acceleration sensor
8 acceleration sensor measurement axis
9 maximum value, no tilt
10 minimum value, no tilt 11 difference, no tilt
12 maximum value, tilt
13 minimum value, tilt
14 offset

The invention claimed is:

1. A method for determining the inclination of a tower, in particular of a wind turbine, in relation to a gravitational field, comprising:
    evaluating the output signal from an acceleration sensor configured to pick up a static acceleration in the direction of a sensor measurement axis, characterized in that the acceleration sensor is attached to a component, which can be rotated about the longitudinal axis of the tower in an azimuth angular range of at least 180°, such that the sensor measurement axis is oriented substantially parallel to a plane of rotation of the component;
    successively measuring and recording an output signal, in the case of various azimuth angles by rotating the component between measurements; and
    determining the inclination by evaluation of a series of measurements obtained.

2. The method of claim 1, wherein the component is rotated in uniform azimuth angle steps.

3. The method of claim 1 wherein at any given azimuth angle, a series of output signals is successively measured and recorded and an averaged value is then determined and recorded from the series of output signals and is taken as a basis for the series of measurements.

4. The method of claim 1, wherein the evaluation comprises a determination of a maximum value and of a minimum value of the series of measurements as well as a determination of the difference between the maximum value and the minimum value.

5. The method of claim 1, wherein the inclination is calculated using the following formula:

$$\alpha = \arcsin\left[\frac{1}{2} \frac{a_{max} - a_{min}}{g}\right]$$

wherein $\alpha$ denotes the inclination angle, g denotes the gravitational acceleration, $a_{max}$ denotes a maximum value of the series of measurements and $a_{min}$ denotes a minimum value of the series of measurements.

6. The method of claim 1, wherein the inclination is calculated using the following formula:

$$\alpha = \arcsin\left[\frac{1}{2} \frac{a_{max} - a_{min}}{g \cdot \cos(\beta)}\right]$$

wherein $\beta$ denotes a tilting of the sensor measurement axis relative to a plane of rotation.

7. The method of claim 1, wherein a tilting of the sensor measurement axis relative to a plane of rotation is determined from the series of measurements, preferably in that an offset of a variable portion of the series of measurements is determined and is considered in the determination of the inclination.

8. The method of claim 1, wherein the offset is determined by forming a sum of a maximum value and of a minimum value and dividing the product by two and subtracting the product from the maximum value.

9. The method of claim 1, wherein the tilting is calculated from an offset using the following formula:

$$\beta = \arcsin\left[\frac{a_0}{g}\right]$$

wherein $\beta$ denotes the tilting, g denotes a gravitational acceleration and $a_0$ denotes the offset of a variable portion of the series of measurements.

10. The method of claim 1, wherein a second acceleration sensor is attached to the component such that a sensor measurement axis is oriented substantially parallel to a plane of rotation of the component and at a right angle to a sensor measurement axis of a first acceleration sensor, an output signal from a second acceleration sensor being measured and recorded in addition to an output signal from the first acceleration sensor, the inclination additionally being determined by evaluation of a second series of measurements obtained.

11. The method of claim 1, wherein a further acceleration sensor is attached to the component such that a sensor measurement axis is oriented substantially vertically to a plane of rotation of the component, the output signal from a further acceleration sensor being measured and recorded in addition to the output signal from the first acceleration sensor, the inclination additionally being determined by evaluation of a further series of measurements obtained.

12. The method of claim 1, wherein an azimuth angle is determined for any output signal and the series of measurements, a second series of measurements a further series of measurements is supplemented by recording the azimuth angle associated with each output signal, to produce a function graph consisting of ordered pairs, to calculate a direction of the inclination.

13. A system for determining the inclination of a tower, in particular of a wind turbine, in relation to a gravitational field, comprising:
    an evaluation module configured to evaluating an output signal from an acceleration sensor configured to pick up a static acceleration in the direction of a sensor measurement axis, characterized in that the acceleration sensor is attached to a component, which can be rotated about the longitudinal axis of the tower in an azimuth angular range of at least 180° such that the sensor measurement axis is oriented substantially parallel to a plane of rotation of the component;
    an output signal recorder and measure module configured to measure and record the output signals, in the case of various azimuth angles by rotating the component between measurements; and
    a determination module configured to determine the inclination by evaluation of a series of measurements obtained.

* * * * *